R. ALLEN.
GUDGEON PIN BUSH FOR PISTONS.
APPLICATION FILED MAR. 2, 1920.
1,415,422.
Patented May 9, 1922.
2 SHEETS—SHEET 1.
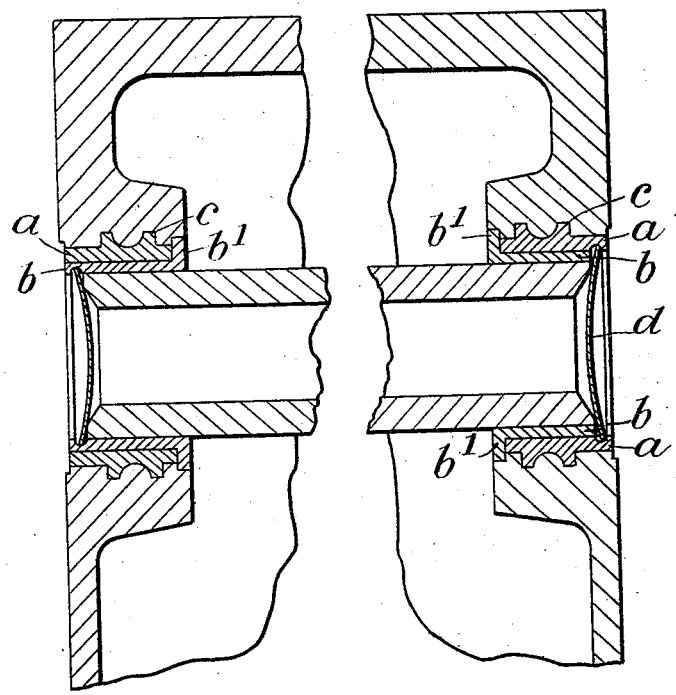
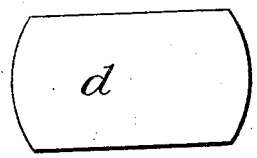
Inventor
Robert Allen
By R. ALLEN.
GUDGEON PIN BUSH FOR PISTONS.
APPLICATION FILED MAR. 2, 1920.
1,415,422.
Patented May 9, 1922.
2 SHEETS—SHEET 2.
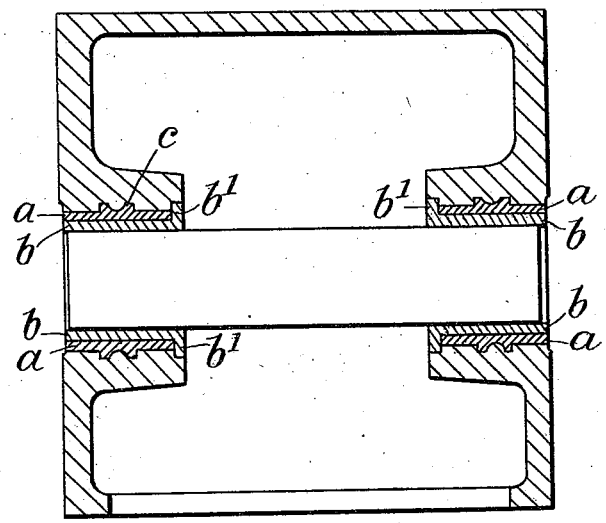
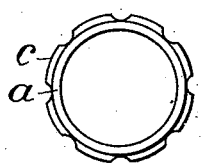 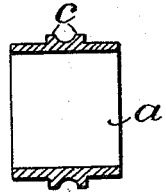 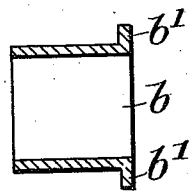
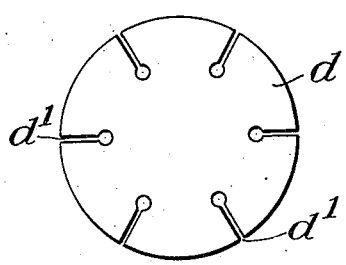 
Inventor
Robert Allen
By H. B. Wilson & Co
Attorneys

UNITED STATES PATENT OFFICE.

ROBERT ALLEN, OF WOODCOTE, READING, ENGLAND.

GUDGEON-PIN BUSH FOR PISTONS.

1,415,422.  Specification of Letters Patent.  Patented May 9, 1922.

Application filed March 2, 1920. Serial No. 362,706.

*To all whom it may concern:*

Be it known that I, ROBERT ALLEN, a subject of the King of Great Britain and Ireland, and a resident of Chiltern Rise, Woodcote, Reading, county of Berkshire, England, have invented certain new and useful Improvements in Gudgeon-Pin Bushes for Pistons, of which the following is a specification.

The present invention has for its objects an improved gudgeon pin bush for pistons and also an improved method of fitting the bush to the piston and is particularly applicable to pistons made of aluminium or similar alloys.

According to the present invention a compound bush comprising inner and outer members is employed, the outer member of which is either cast into the piston or pressed into a hole in the heated piston so that on cooling the contraction of the piston holds the member firmly in place, and the inner member of the bush which is of malleable or cast steel case hardened on its inside is accurately machined to fit tightly within the outer member and receive the gudgeon pin. In the event of the outer member being cast into the piston, the parts of the piston surrounding the bushes are preferably formed with recesses adapted to mould keying projections on the outer member of the bush in order to prevent rotary or end movement of the member within the piston. The outer member of the bush is preferably of a suitable unhardened steel alloy and the inner member is preferably a malleable cast machined liner. Discs or end shields of brass, copper or other non-scoring metal may be inserted in the bushes at the gudgeon pin ends to prevent the pin marking the cylinder walls.

Two examples of the present invention are illustrated in the accompanying drawings wherein:—

Figure 1 is a vertical section of a piston and gudgeon pin with the improved bush and protector pads or shields of brass or copper applied.

Figure 2 is a vertical section of a piston wherein a modified form bush is applied.

Figures 3 and 4 are end elevation and vertical section of the outer member of the bush and Figure 5 shows in vertical section the inner member of the bush.

Figures 6 and 7 are face and edge elevations of the protector pad or shield shown in Figure 1 and Figures 8 and 9 are similar views showing a modified form of protector pad or shield.

In the form of the invention shown in Figure 1 the improved bush comprises the outer member $a$ of unhardened nickel steel which in this case is cast in an aperture in the piston and a malleable or cast inner flanged member $b$ both of which are accurately machined so that the inner member $b$ fits closely within the outer member $a$. The walls of the apertures in the piston are slotted intermittently in order to produce a series of projections $c$ on the bush member to key the same in place and thereby prevent rotary or end movement within the piston.

The inner member $b$ of the bush which is placed in position from within the piston and held by the flange $b^1$ is machined on its inside to allow the gudgeon pin to move endways and to revolve within the bush and is then case hardened. An annular groove is cut on the inside and towards the outer end of the inner bush member $b$ at one end of the pin and a similar groove is cut in the outer end of the outer bush member $a$ at the other end of the pin in order that the copper protector pads $d$ may be pressed into place, and engage the grooves when the pin is in position to serve as shields to prevent the pin scoring the cylinder walls. As shown in Figures 6 and 7 the protector discs $d$ are formed with radial slots $d^1$ around their edges in order that they may readily spring into place and their edges then engage the annular grooves in the bushes.

In the form shown in Figure 2 the outer member $a$ of the compound bush is cast in place in the piston as before. The grooves cut in the inner walls of the piston apertures are shallow and produce a series of keying projections $c$ around the outer bush member as seen in Figures 3 and 4. In the example the protecting disc of copper or the like is omitted.

A simplified form of protector or shield $d$ is shown in Figures 8 and 9 wherein the shield takes the form of a strip with its ends rounded to the curvature of the bush. This enables the shield to readily spring into place in the bushes when pressure is applied to the centre of said shield.

This improved method of bushing is particularly applicable to pistons made of aluminium and similar alloys but it can of course be applied to cast iron and steel pistons. In the event of wear setting in at the bush all that is necessary is to replace the inner member of the bush and thereby a great saving is effected.

In some cases instead of casting the outer member of the bush as described it may be machined slightly larger than the hole in the piston and pressed into position after the piston has been heated to enlarge the hole, being firmly held by the subsequent contraction of the piston in cooling.

I claim:—

1. The improved gudgeon pin bush for pistons comprising an outer bush member and an inner bush member adapted to fit closely within the outer bush member and receive the gudgeon pin.

2. The improved gudgeon pin bush for pistons comprising an outer bush member, an inner bush member fitted closely within the outer member to receive the gudgeon pin and a shield of like non-scoring metal fitted in the bush to cover the end of the gudgeon pin substantially as described.

3. In the improved gudgeon pin bush for pistons as claimed in claim 2, in which said shield is in the form of a disc slotted radially at its edges in order that it may be pressed into and retained in an annular internal groove in one of the bush members.

4. In the improved gudgeon pin bush for pistons as claimed in claim 2, in which said shield is in the form of a plate of metal having edge portions shaped to fit into an internal annular groove formed in one of the bush members.

5. The combination with a piston and its pin of a relatively-fixed shield extending over the end of the pin to prevent the latter from scoring the cylinder wall.

6. The combination with a piston and its pin, of an outer bush member fixed in the piston, a removable inner bush member fitted in the outer member to receive the pin, and a shield engaging one of the bush members and limiting endwise movement of the pin in one direction.

7. The combination with a piston and its pin, the former having spaced pin-bearings, of an outer bush member fixed in each bearing, a removable inner bush member fitted in each outer member for receiving the pin, each inner bush member having its inner end flanged to limit its outward movement, the outer end of one of the inner bush members and the outer end of one of the outer bush members being grooved, and shields fitted in said grooves to limit the longitudinal movement of the pin in the inner bush members.

8. The combination with a piston and its pin, the former having spaced pin-bearings, of an outer bush member fixed in each bearing, a removable inner bush member fitted in each outer member to receive the pin, and means for limiting the outward longitudinal movement of the inner members in the outer members.

9. The combination of a piston of relatively-soft metal having pin bearing openings, outer bush members of a relatively-hard metal rigidly and permanently secured in said openings, and pin-receiving inner bush members removably fitted in the outer members.

In testimony whereof he affixed his signature.

ROBERT ALLEN.